(No Model.) 4 Sheets—Sheet 1.

A. A. FISHER & A. J. HART.
SEWING MACHINE.

No. 357,379. Patented Feb. 8, 1887.

Witnesses
T. Walter Fowler
H. B. Applewhaite

Inventor
Alfred A. Fisher
Albert J. Hart
By their Attorneys
A. H. Evans & Co.

(No Model.) 4 Sheets—Sheet 2.
A. A. FISHER & A. J. HART.
SEWING MACHINE.
No. 357,379. Patented Feb. 8, 1887.
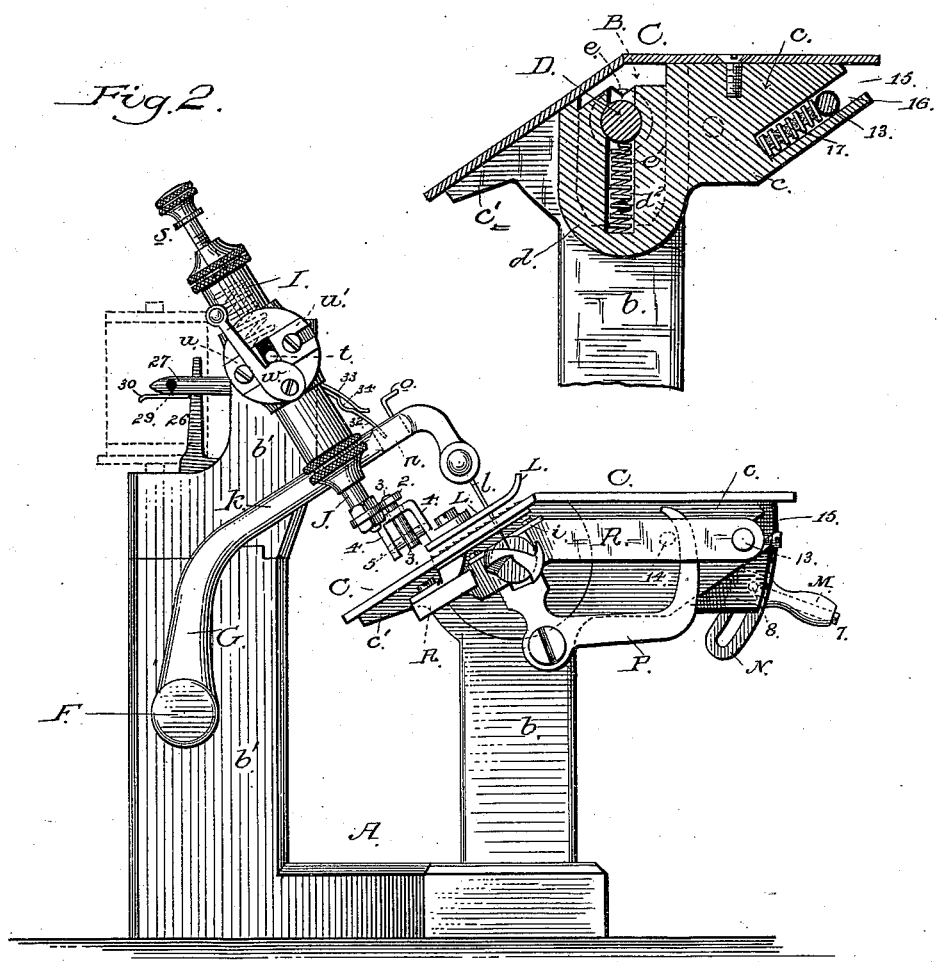

(No Model.) 4 Sheets—Sheet 3.

A. A. FISHER & A. J. HART.
SEWING MACHINE.

No. 357,379. Patented Feb. 8, 1887.

Witnesses
T. Walter Fowler
H. B. Applewhaite

Inventor
Alfred A. Fisher
Albert J. Hart
By their Attorneys
A. H. Evans & Co.

(No Model.) 4 Sheets—Sheet 4.
A. A. FISHER & A. J. HART.
SEWING MACHINE.
No. 357,379. Patented Feb. 8, 1887.
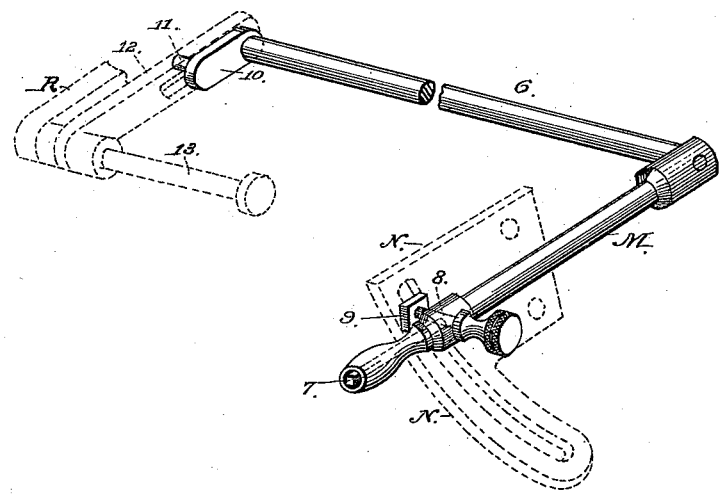
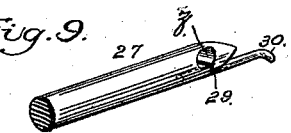
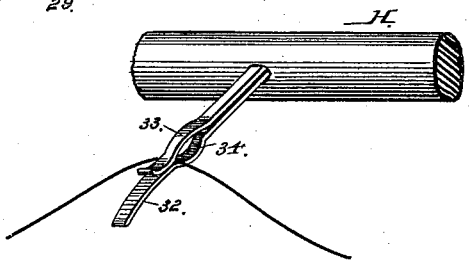

UNITED STATES PATENT OFFICE.

ALFRED A. FISHER AND ALBERT J. HART, OF BROOKLYN, NEW YORK, ASSIGNORS TO THE PACIFIC TUCKING AND MANUFACTURING COMPANY, OF SAN FRANCISCO, CALIFORNIA.

SEWING-MACHINE.

SPECIFICATION forming part of Letters Patent No. 357,379, dated February 8, 1887.

Application filed May 20, 1886. Serial No. 202,720. (No model.)

*To all whom it may concern:*

Be it known that we, ALFRED A. FISHER and ALBERT J. HART, citizens of the United States, residing at Brooklyn, in the county of Kings and State of New York, have invented certain new and useful Improvements in Sewing-Machines, of which the following is a full, clear, and exact description, reference being had to the accompanying drawings, forming part of this specification, in which—

Figure 1:
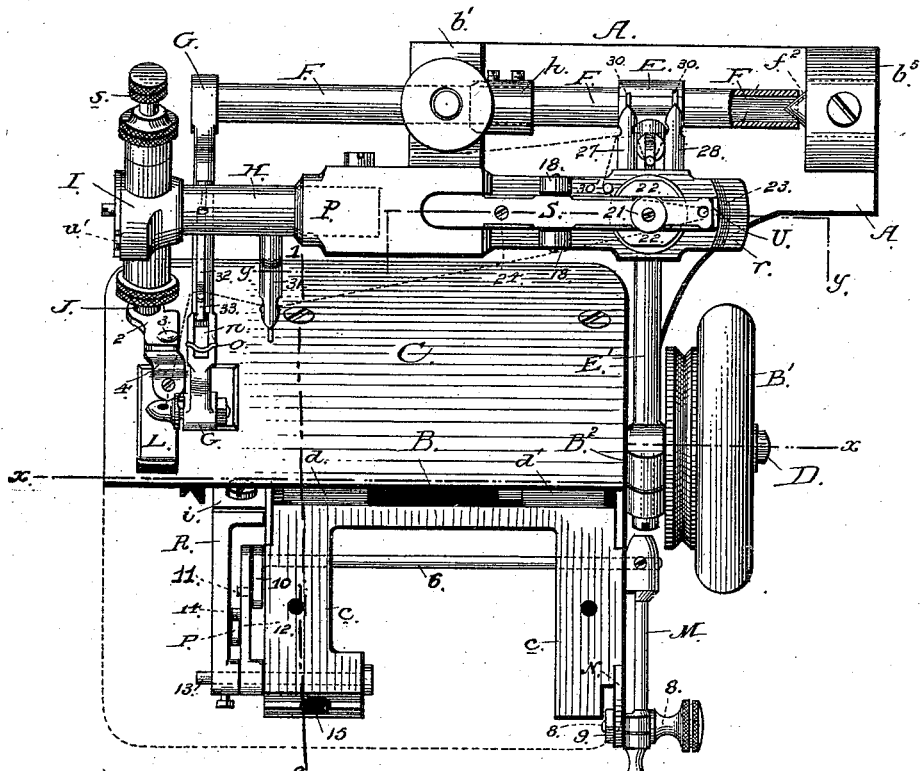
Figure 4:
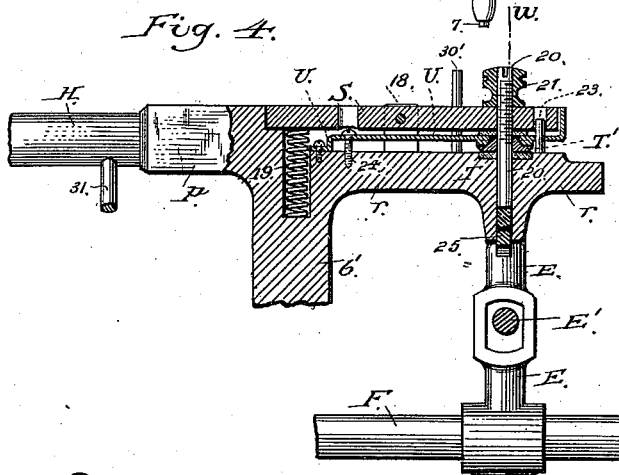
Figure 3:
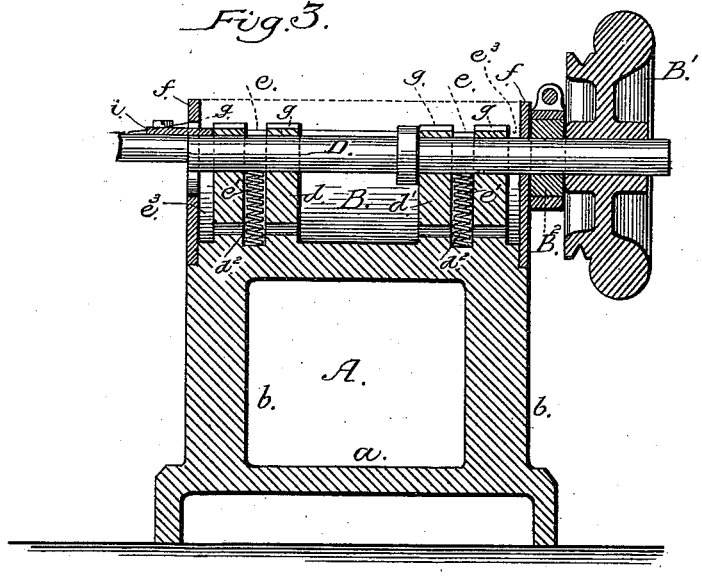
Figure 5:
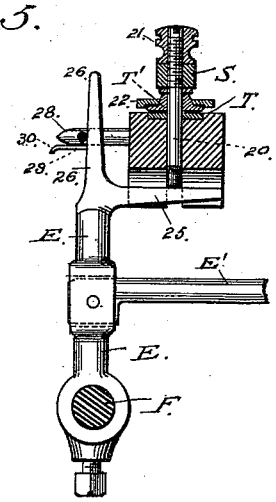
Figure 7:
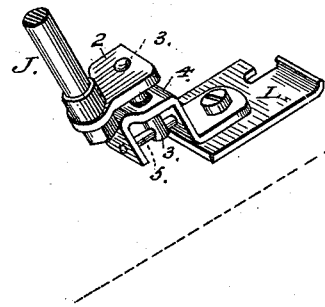

Figure 1 represents a plan view of a sewing-machine embodying our improvements, and showing a portion of the cloth or work plate removed. Fig. 2 is a side elevation. Fig. 3 is a longitudinal sectional view on the line $xx$ of Fig. 1, showing the peculiar construction of the oiling-chambers. Fig. 4 is a sectional view of the tension device, taken on the line $yy$ of Fig. 1. Fig. 5 is a transverse sectional view of the same on the line $ww$ of Fig. 4. Fig. 6 is a sectional view on the line 1 2 of Fig. 1. Figs. 7, 8, 9, and 10 are details of construction, to be hereinafter referred to.

Our invention relates to certain improvements in sewing-machines; and it consists in the construction and combination of devices, which we will hereinafter describe, and specifically point out in the claims.

To enable others skilled in the art to which our invention appertains to make and use the same, we will now describe a preferred construction and indicate the manner in which we have carried it out.

In the said drawings, A represents the main casting of the sewing-machine, consisting of a base-plate, $a$, and suitable vertical posts or arms $b\ b'$, in which are mounted the several operative mechanisms comprising the machine. The upper portions of the posts $b$ are connected together, and are formed with an oil-chamber, B, the purpose and construction of which we will hereinafter describe.

It will be observed the upper portions of the posts $b$ are so constructed as to form a horizontal and an inclined section, $c\ c'$, the point of juncture being at or near the longitudinal center of the posts.

The bed or work plate C is preferably formed in two section secured to the horizontal and inclined sections of the supports or posts $b$, with the throat-plate at or near the apex thereof in such manner that the operator may readily adjust the work on the inclined sections and beneath the presser-foot, leaving at the same time sufficient room over the horizontal section of the bed-plate for the proper manipulation of the goods—a feature greatly to be desired in tucking-machines, to which our improvements are particularly adapted.

The driving-shaft D is suitably mounted in studs $d\ d'$ in the oil-chamber B, and is provided with the usual hand-wheel, B', eccentric $B^2$, and at its forward end with a suitable loop-forming device, these features being of any approved form, and it is not thought necessary to minutely describe their exact construction and operation, except the studs $d\ d'$, and the peculiar manner of automatically oiling the drive-shaft and causing the surplus oil to find a ready passage to the oil-chamber. These features are readily accomplished by providing the studs $d\ d'$ with vertical passages or oil-chambers $e$, in the base of which are placed springs $e'$, which automatically feed the oil to the drive-shaft during the rotation of the same.

The ends of the oil-chamber B are practically closed by the plates $f$, which are arranged in close proximity to the studs, the upper surfaces of which are provided with grooves $g$, that intersect the passages or oil-chambers $e$ and permit the surplus oil from said chambers to find an easy exit to the main oil-chamber B. From this construction it is manifest the rapid rotation of the drive-shaft causes a suction within the oil-chambers $e$, which, through the agency of the interposed springs $e'$, draws said oil upward and lubricates the shaft. That portion of the oil which escapes at the top of the chamber $e$ will run into the grooves $g$, thence directly into the main oil-chamber B, or else into the space $e^3$ between the studs and plates $f$, from whence it finally enters the main oil-chamber through suitable passages or openings $d^2$ in the lower portions of said lugs. We are thus enabled to cause an automatic lubrication of the shaft without heating the bearing. At the same time we confine the surplus oil within the oil-chamber B, and thereby prevent its coming into contact with the goods.

The eccentric $B^2$ on the driving-shaft is connected to an oscillating arm E, secured upon a rock-shaft, F, journaled within a vertical arm or post, $b'$, projecting from the main casting. This rock-shaft F has a hollow end, into which the material is placed to lubricate its bearing, said bearing consisting of a conical pin, $f^2$, adjustably secured in an arm, $b^5$, on the main casting A. The shaft F at its center is provided with a collar, $h$, having a bearing in the post $b'$, and is adjustable on said shaft by set-screws, whereby the wear of the parts may be taken up and a firm bearing always obtained for the shaft.

The needle-arm G in the present instance is an inclined bent arm secured to one end of the rock-shaft, and is so constructed that its straight arm $k$ is parallel, or nearly parallel, with the inclined portion of the work-plate, its forward end being bent downward, and is provided with the usual means for clamping the eye-pointed needle $l$, as shown. The straight arm $k$ of the needle-arm is provided with a slot, $n$, and a loop, $o$, the purpose of which we will hereinafter fully describe in connection with the tension device, with which they are closely identified.

The upper portion of the arm or post $b'$ terminates in horizontal arms $p$ and $r$, in the former of which is adjustably secured a horizontal shaft, H, having a head, I, secured thereto at right angles to the inclined portion of the work-table, and within which the presser-bar J moves, the said head being provided with a spring which bears upon the top of the presser-bar to keep the presser-foot against the work, the amount of pressure being determined by a set-screw, $s$, in the top of the head, bearing against the spring in the usual manner. A pin, $t$, projecting from the upper side of the presser-bar, extends through a slot formed within the head and between two plates, $u\ u'$, and is acted upon by a cam, $w$, to raise the presser-foot from the goods and to keep the presser from turning. The continued movement of the pin $t$ within the slot between the plates will necessarily cause some wear at the point where these two features contact with each other. Therefore some provision must be made to take up the wear thus occasioned. To accomplish this feature, we secure the plate $u'$ in such manner—as by a slot and set-screw—that it may be adjusted to take up whatever wear is necessary, and at the same time secure the pin $t$, so that the presser-foot will be held against lateral displacement.

The lower end of the presser-bar has secured thereto a plate, 2, from which depends a cylindrical stud, 3, that passes through an oval or other elongated opening formed in the upper portion of an arched plate, 4, to the long arm of which the presser-foot L is secured. A pin, 5, passes transversely through the stud 3 and plate 4 and serves as a pivot, which, in conjunction with the slot in plate 4, enables the presser-foot to have a slight movement to adjust itself to any unevenness caused by an uneven wear of the feed mechanism. This feature is of great importance, as it enables the presser-foot to automatically adjust itself firmly against the work at all times, and although some portions of the feed devices may wear more rapidly than others, yet the presser-foot will always adjust itself to such irregularity automatically.

The mechanism for changing the feed of the machine comprises a shaft, 6, mounted within the upper portions of the posts or arms $b$, and having secured to one end an arm or lever, M, the outer end of which is bored to receive a set-screw, 7, having a squared end adapted to receive a suitable key, (not shown,) whereby said lever M, when adjusted, cannot be moved from its position and the feed altered without the employment of this key. The inner end of the set-screw 7 bears against another screw, 8, passing transversely through the lever and through a slotted gage-plate, N, secured to the upper portion of one of the posts $b$ and engaging a nut or washer, 9, as shown in Fig. 1. By these means it will be readily observed the lever M may be raised or depressed, and after the desired feed has been obtained the operator tightens up the screw 8, which clamps the nut 9 and lever firmly against the plate N. As a matter of precaution, and to prevent any possibility of the lever being moved from its adjusted position, and thereby affecting the feed of the machine, we introduce the key, before referred to, into the end of the lever until it engages the square end of the screw 7. A few turns of the key will cause said screw to bind tightly against the transverse set-screw 8, when the key is removed, and the feeding mechanism will be found to be securely locked against displacement, and cannot be unlocked except by again introducing the key and unloosening the screw.

The end of the shaft 6 opposite to that which carries the lever M is provided with a crank-arm, 10, having a pin, 11, which projects through an elongated slot formed in one end of an arm, 12, journaled upon a shaft, 13, and having a pin, 14, which is engaged by the hooked end of a lever, P, fulcrumed upon a stud projecting from the post $b$, and having its short arm bifurcated to permit the passage of the driving crank-shaft by which said lever P is operated to cause its hooked end to engage the pin 14 and move the feed-lever R, which is secured by a set-screw to the shaft 13, and is provided with the usual means for feeding the goods forward.

The feed-lever R is cut away near its center to permit the passage through the same of the driving-shaft which operates the lever to give the proper motion to the feed.

The driving-shaft is confined within the cut-away portion of the lever P by a plate, $i$, secured to said lever in such manner that when the under surface of said plate becomes worn by continual contact with the shaft the same may be removed and reversed, thus presenting a new surface to the action of the driving-shaft.

The upper end of one of the posts $b$ is slotted at 15 to receive the shaft 13, carrying the lever R, and is bored to form an oil-chamber, 16, within which is placed a spring, 17, for feeding the lubricating material to the shaft. This oil-chamber, as well as those for oiling the drive-shaft, may also be provided with wicks for assisting in raising the oil, the shaft 13 being lubricated by means substantially like that which ejects the oil from the chambers $e$ to lubricate the drive-shaft, whereby during the running of the machine the shaft 13 is automatically and continually supplied with oil, the action of the spring causing the oil to advance upward in the chamber sufficiently far to thoroughly lubricate the shaft.

We will now describe the mechanisms for controlling the needle-thread during that period of the operation of the machine when the needle is on the downstroke and before the needle-eye reaches or enters the goods. This tension mechanism is mounted upon and within the horizontal arm $r$, and comprises a lever, S, pivoted between lugs 18 on the arm $r$, and with its short arm in engagement with a spring, 19, in the post $b'$ to cause the long arm of the lever to be depressed. This latter arm is provided with a threaded pin, 20, passing through a threaded aperture in the long arm of the lever, and a jam-nut, 21, which secures the pin after the latter has been adjusted. The arm $r$ is provided with an opening for the set-pin 20, and also with a stationary disk, T, which forms the lower clamping-plate, and between which and the upper clamping plate or disk T' the thread is intermittently clamped. This upper disk or clamping-plate T' is loosely seated upon the lower disk, and is adapted to have a slight rotary movement during the intermittent passage of the thread. It is provided with a conical shoulder, which engages a correspondingly-formed groove in the lower face of a disk, 22, secured to or forming a part of a spring-plate, U, located directly beneath the lever S, with its inner end secured to the post $b$. The outer or free ends of the spring U and lever S are perforated for the reception of a guide-pin, 23, projecting from the horizontal arm $r$, while a screw, 24, engages the spring near its other end, and is designed to increase or diminish the tension of the spring and the consequent friction between the clamping plates or disks.

As before stated, the eccentric $B^2$ on the driving-shaft is connected by a pitman, E', with an oscillating arm, E, upon the rock-shaft F, said arm E being provided with means—such as an arm, 25—for raising the pin 20, and thereby releasing the thread, and also with an arm or "pull-off," 26, adapted to draw from the spool a sufficient amount of thread to provide for the succeeding stitch. The operations of these features are substantially as follows:

The movement of the drive-shaft through the agency of the pitman E' causes the arm E to oscillate in unison with the needle-arm, as these two elements are mounted on a common shaft. While the arm E is making its forward stroke, the horizontal arm 25 engages the end of the pin 20, or a washer interposed between said pin and arm, and raises the same. As the pin is forced upward it carries with it the long arm of the lever S, thus depressing the short arm of said lever, removing the pressure from the thread-clamping disks, and permitting the passage of the thread between said disks. While the arm E is making its return-stroke, it causes the vertical arm 26 to engage the thread and pull off a sufficient amount to supply the next movement of the needle-arm. Thus we automatically give to the tension-plates an intermittent movement, and at the same time we pull from the spool, when the disks are clamped, a sufficient amount of thread to answer the desired purpose.

The thread from the spool passes through the guides 27 and 28, having the usual eye, $z$, and provided with a slit, 29, and projecting finger 30, between which and the lower face of the guide the thread is introduced, after which it readily finds the slit 29. After passing through the guides 27 and 28, the thread is passed around a pin, 30', thence between the clamping-disks around pin 23, thence again between said disks to a guide, 31, projecting from the shaft H, and thence to the needle. The needle-arm, as before described, is provided with a slot, $n$, and loop $o$, said loop serving as a guide to retain the thread on top of the needle-bar.

On the shaft H is adjustably secured what we designate as a "thread-retainer" device, consisting of two plates, 32 and 33, the latter being of less tensile strength than the former, whereby it yields to permit the passage of the thread between said plates during the upward movement of the needle-arm. The plate 32 is provided with a curved or other depression, 34, into which said thread is passed by the needle-arm. Within this depression between the plates the thread is thus temporarily held until the needle has entered the goods, thus avoiding a loose stitch.

Having thus described our invention, what we claim as new, and desire to secure by Letters Patent, is—

1. The bed or work plate having a horizontal portion and a portion inclined thereto, the throat-plate being set within the inclined portion at the apex thereof, in combination with a reciprocating eye-pointed needle operating in a plane at right angles to the plane of the inclined portion of the said bed-plate, and complementary stitch-forming mechanism below the said bed-plate, substantially as herein described.

2. In a sewing-machine, the main frame or casting A, having a horizontal oil-chamber formed in its upper surface, and the studs $d$ $d'$, having vertical oil-chambers $e$, and passages $d^2$, formed therein, in combination with the driving-shaft, springs for ejecting the oil from the vertical chambers, and the plates $f$, forming between themselves and the studs $d$ $d'$ passages into which the oil passes to the main oil-chamber, substantially as herein described.

3. In a sewing-machine, the combination, with a presser-bar, of a presser-foot, the cylindrical stud 3, the plate 4, having an elongated opening for the stud, and a transverse pin, 5, upon which said plate is pivoted, substantially as herein described.

4. In a sewing-machine, the combination, with the shaft H, having the head I, of a presser-bar having a pin, $t$, projecting therefrom, the plate $u$, the adjusting-plate $u'$, and the lifting cam $w$, substantially as herein described.

5. In a sewing-machine, the feeding mechanism comprising the lever R, the arms 10 and 12, in engagement with each other, the shaft 13, the lever P, having a hooked end engaging a pin on the arm 12, and the main drive-shaft, in combination with a lever, M, for regulating the feed, a gage-plate, an adjusting-screw for holding the lever, and a screw or bolt having a squared end engaged by a key to hold the adjusting screw and lever in a locked position, substantially as herein described.

6. In a sewing-machine, the rock-shaft F, the arm E, projecting from said shaft, and the arm E' and its operative mechanism, in combination with the horizontal and vertical arms 25 and 26 on the arm E, adapted to cause an intermittent movement of the tension and to draw from the spool a predetermined amount of thread for the succeeding stitch, substantially as herein described.

7. In a sewing-machine, the main frame or casting A, having the post $b'$, in combination with a tension device consisting of a spring-actuated lever, S, pivoted to a horizontal arm on the post, a horizontally-arranged tension-spring, U, a stationary clamping-disk, and a loosely-mounted clamping-disk, an adjusting-pin, 20, and the arm 25, engaging said pin and operated by power derived from the drive-shaft to cause an intermittent movement of the tension, substantially as herein described.

8. In a sewing-machine, a tension device comprising a spring-actuated lever, a horizontally-arranged adjusting spring-plate, a stationary clamping-disk, and a loosely-mounted rotating clamping-disk, substantially as herein described.

9. In a sewing-machine, the thread-guides having the eye $z$, and the slit 29, intersecting said eye, in combination with a projecting finger, 30, for guiding the thread to the slit, substantially as herein described.

10. The combination, with its operative mechanism, of a needle-arm having a thread-guide, O, and slot $n$, and contiguous plates located immediately over said needle-arm, and having a depression between them, into which the thread is automatically passed by the needle-arm and temporarily held, substantially as and for the purpose specified.

11. In a sewing-machine, the main frame or casting A, having the post $b'$, in combination with the rock-shaft F, mounted in said post and having an oil-chamber in one end, a needle-arm at the opposite end of the shaft, an arm oscillating with said shaft and operating the tension and pull-off devices, and an adjustable collar, $h$, having a bearing in the post, substantially as herein described.

ALFRED A. FISHER.
ALBERT J. HART.

Witnesses:
LOUIS P. ST. CLAIR,
D. S. BARCLAY.